United States Patent [19]
McNutt

[11] Patent Number: 5,990,267
[45] Date of Patent: Nov. 23, 1999

[54] OPTICAL FIBRE AND OPTICAL FIBRE TAPE, AND METHOD FOR MAKING SAME

[75] Inventor: Christopher McNutt, Saint Germain en Laye, France

[73] Assignee: Alcatel Cable, Clichy, France

[21] Appl. No.: 08/945,630

[22] PCT Filed: Apr. 30, 1996

[86] PCT No.: PCT/FR96/00656

§ 371 Date: Oct. 30, 1997

§ 102(e) Date: Oct. 30, 1997

[87] PCT Pub. No.: WO96/35135

PCT Pub. Date: Nov. 7, 1996

[30] Foreign Application Priority Data

May 3, 1995 [FR] France ................................. 95 05269

[51] Int. Cl.$^6$ .................................................. C08G 73/10
[52] U.S. Cl. ........................ 528/322; 525/902; 525/928; 525/929; 428/423.5; 385/123; 385/128
[58] Field of Search ...................... 528/322; 428/423.5; 525/902, 928, 929; 385/123, 128

[56] References Cited

U.S. PATENT DOCUMENTS 3,435,003  3/1969  Craven et al. .
3,872,057  3/1975  Pazos .

FOREIGN PATENT DOCUMENTS

WO9416127  7/1994  WIPO .
WO9500576  1/1995  WIPO .

OTHER PUBLICATIONS

Patent Abstracts of Japan, vol. 11, No. 267 (C–443), Aug. 28, 1987 corresponding to JP–A–62 068809 (NTTC) Mar. 28, 1987.

*Primary Examiner*—Duc Truong
*Attorney, Agent, or Firm*—Sughrue, Mion, Zinn, Macpeak & Seas, PLLC

[57] ABSTRACT

The present invention relates to an optical fiber (1) comprising an optical core (2) for guiding the majority of the lightwaves transmitted by the fiber, and surrounded by optical cladding (3), itself surrounded by a protective covering (4) of a plastics material, characterized in that the plastics material (4) is a reversibly cross-linked material.

8 Claims, 2 Drawing Sheets

OPTICAL FIBRE AND OPTICAL FIBRE TAPE, AND METHOD FOR MAKING SAME

The present invention relates to an optical fiber, to an optical fiber ribbon, and to a method of manufacturing them.

In well-known manner, an optical fiber is designed to transmit lightwaves and is constituted by an optical core, made of a silica-based material, surrounded by optical cladding, likewise made of a silica-based material. The optical core is designed to guide the majority of the lightwaves transmitted by the optical fiber. These two elements (the optical core and cladding) constitute the optical portion of the fiber, also referred to as the "bare" optical fiber. This portion is very sensitive to external disturbances, which can give rise to damage to its transmission properties, and thus to degraded operation of the optical fiber.

In order to protect the bare fiber against external disturbances, it is well known to cover the optical cladding in a protective layer of plastics material, referred to as a "primary" covering. It is optionally possible to have other protective layers over the primary covering, and more particularly a second protective layer referred to as a "secondary" covering, together with an identification layer which is usually colored.

The solution presently used for making protective layers consists in covering the optical cladding in thermosetting resin (i.e. a resin which hardens by cross-linking on being heated), e.g. a resin that is capable of being cross-linked under the effect of ultraviolet radiation. The ultraviolet radiation serves to provide the heat necessary for the cross-linking reaction (in practice a temperature of about 200° C. is necessary for cross-linking purposes).

Also in known manner, an optical fiber ribbon is an assembly comprising a plurality of optical fibers that are bare or covered in one or more layers for protective or identification purposes, the fibers being disposed side by side and parallel to one another, substantially in a common plane, said fibers being held together by means of a common matrix of plastics material, which also serves to protect the fibers against external disturbances. The common matrix is constituted by a thermosetting resin, e.g. a resin capable of cross-linking under the effect of ultraviolet radiation.

In order to cover an optical fiber in a covering layer of thermosetting resin, or indeed to make the protective matrix of an optical fiber ribbon out of such a resin, the body that is to be treated (i.e. the fiber or the set of fibers) is caused to run through a coating die containing the resin in the non-crosslinked state, i.e. in the still-liquid state, and then to run through apparatus suitable for supplying thereto the energy which is required (in the form of heat) for causing cross-linking to take place.

Such apparatus must include complex heater means, and in particular, for a resin that is suitable for being cross-linked under the effect of ultraviolet radiation, it must include ultraviolet lamps associated with matching reflectors for the purpose of focusing the radiation on the body to be treated. In addition, it is necessary under such circumstances to provide means that prevent the infrared radiation which is emitted together with the ultraviolet radiation from reaching the body that is to be treated, since the infrared radiation runs the risk of heating the body excessively, thereby degrading its mechanical and optical properties.

Such apparatus is complex, and consequently quite expensive.

In addition, it requires continuous maintenance, and that also is expensive.

The object of the present invention is thus to provided an optical fiber and an optical fiber ribbon which can be manufactured without requiring the use of equipment that is expensive to purchase or that is expensive to maintain.

To this end, the present invention provides an optical fiber comprising an optical core for guiding the majority of lightwaves transmitted by said fiber, the core being surrounded by optical cladding, itself surrounded by a protective covering of plastics material, the fiber being characterized in that said plastics material is a reversibly cross-linked material.

The present invention also provides an optical fiber ribbon comprising a plurality of optical fibers disposed side by side and parallel to one another, substantially in a common plane, the fibers being embedded in a common protective matrix of a plastics material, the ribbon being characterized in that said plastics material is a reversibly cross-linked material.

Reversibly cross-linked materials, also known as "thermoflow" materials, have very low viscosity above a "transition" temperature that may lie in the range 50° C. to 300° C., for example, i.e. above that temperature they are fluid. More precisely, their chemical structure is "de-crosslinked" at the transition temperature (chemical bonds are broken), and it returns to the cross-linked structure (chemical bonds are re-established) merely on being cooled progressively from the transition temperature to a temperature which is generally about 50° C. lower than the transition temperature. This reaction is reversible, i.e. it can be performed in both directions (de-crosslinking followed by cross-linking, and vice versa). The physical properties, and in particular the mechanical properties, of such materials in the cross-linked state are very good: they are comparable to those of thermosetting materials in the cross-linked state, i.e. they are entirely suitable for use as reversibly cross-linked materials in protective layers for optical fibers or in matrices of optical fiber ribbons.

Examples of reversibly cross-linked materials are given in document WO 95/00576, the contents of which are incorporated by reference. The materials described in that document have a transition temperature lying in the range 50° C. to 300° C.

An amplitude of about 50° C. is necessary to observe a change in viscosity by a factor of 100, i.e. substantially total fluidization or quasi-complete hardening, depending on the direction of the reaction.

Other examples of such materials are described in particular, but in non-limiting manner, in the following documents: U.S. Pat. No. 3,435,003, U.S. Pat. No. 3,678,016, and U.S. Pat. No. 3,872,057.

Because of the properties mentioned above, reversibly cross-linked materials, given that they are fluid at temperatures greater than the transition temperature, are easily worked at such temperatures, thereby making it possible to use them at such temperatures for covering individual optical fibers or sets of fibers constituting a ribbon, and this can be done, for example, by means of a conventional coating die.

Thereafter, they become cross-linked merely by cooling, thus avoiding any need to use the complex apparatuses that are conventionally used for performing cross-linking. By way of example, the cooling can be performed by means of a conventional cooling system, or by leaving the treated body at ambient temperature, or indeed by causing it to run through a bath of water.

Thus, the methods and apparatuses for implementing the invention are very simple and less expensive than those of the prior art.

Finally, the reversibility of the cross-linking reaction, which does not occur with thermosetting materials, and also the fluidity of reversibly cross-linked materials at temperatures greater than the transition temperature (giving such materials mechanical properties that are similar to those of thermoplastic materials at such temperatures) makes it easy to strip the optical fiber or the ribbon at such temperatures.

Other characteristics and advantages of the present invention appear from the following description of an optical fiber and of an optical fiber ribbon of the present invention, and also of the method for making them.

In the following figures.

In all of the figures, elements that are common are given the same reference numerals.

Figure 1:
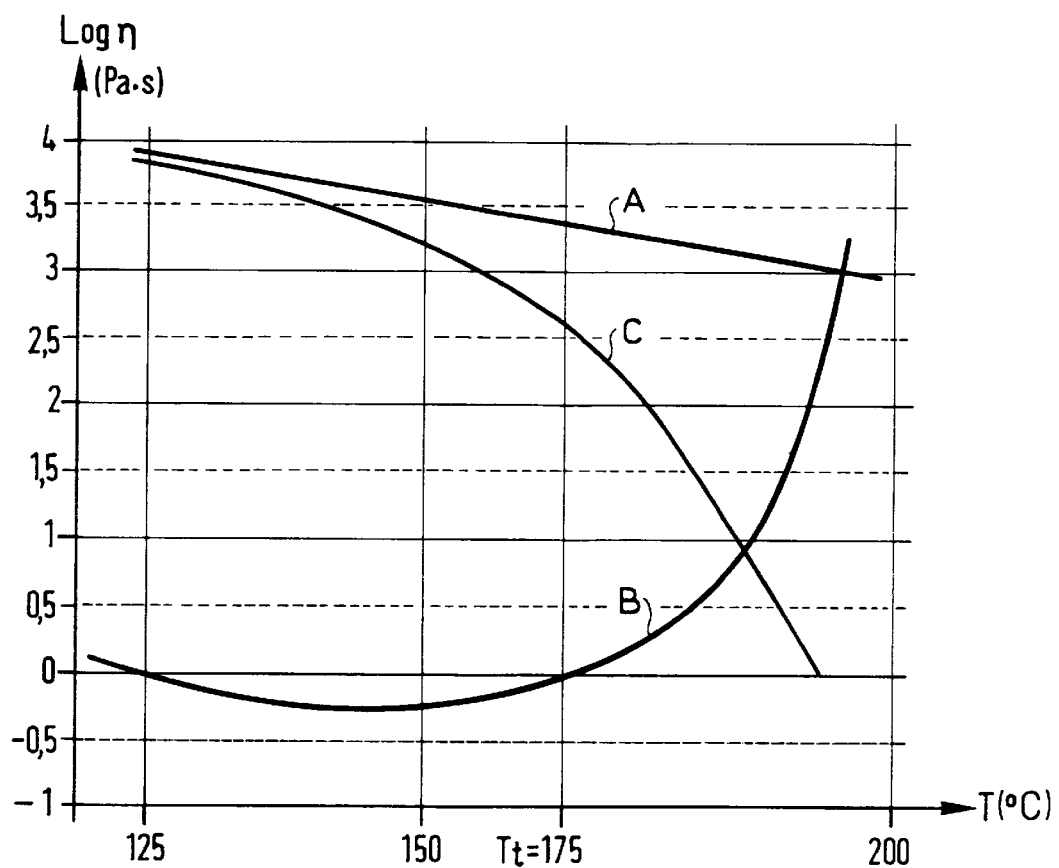
FIG. 1 shows viscosity as a function of temperature for a thermoplastic material, a thermosetting material, and a reversibly cross-linked material.

In FIG. 1:

curve A shows viscosity of a thermoplastic material in terms of log $\eta$ as a function of temperature T;

curve B shows viscosity of a thermosetting material in terms of log $\eta$ as a function of temperature T; and curve C shows viscosity of a reversibly cross-linked material in terms of log $\eta$ as a function of temperature T.

FIG. 1 makes it possible to compare the behavior of a reversibly cross-linked material with that of thermosetting materials such as the resins normally used for covering optical fibers, and with that of thermo-plastic materials.

It can be seen that reversibly cross-linked materials (curve C) have viscosity that decreases greatly from a transition temperature $T_t$ (about 175° C. in the example shown in the figure), so they are fluid above that temperature. Below this temperature, they are of high viscosity, i.e. they are cross-linked and therefore hard.

For thermosetting materials (curve B), the phenomenon is exactly inverted. In addition, the reaction is not reversible such that once they have become hard, it is impossible to return them to the fluid state by lowering temperature.

In thermoplastic materials (curve A), for example polyethylene or polypropylene, where shaping does not involve cross-linking, viscosity does indeed decrease as temperature increases. They are worked by being extruded, therefore requiring equipment that is complex, and in addition they require temperatures that are very high, thus making them unsuitable for use with optical fibers or with optical fiber ribbons since such temperatures run the risk of degrading the optical performance thereof.

Figure 2:
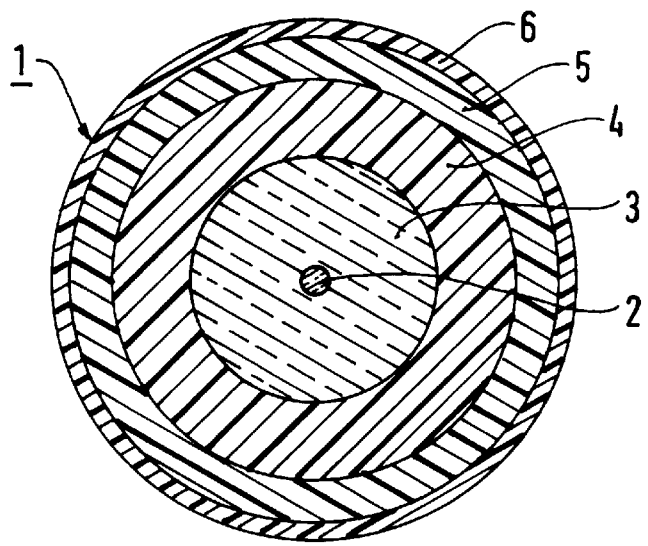
FIG. 2 is a cross-section through an optical fiber of the invention.

FIG. 2 shows an optical fiber 1 of the invention, having an outside diameter that is close to 250 $\mu$m, and comprising, disposed coaxially from the center outwards:

an optical core 2 of silica-based material;

optical cladding 3 of silica-based material;

a primary covering 4 of reversibly cross-linked material;

a secondary covering 5 also of reversibly cross-linked material; and a colored identification layer 6 also made of a reversibly cross-linked material.

In accordance with the invention any of the identification or protective layers (including the primary covering, the secondary covering, etc.) can be made of a reversibly cross-linked material.

More particularly, the reversibly cross-linked material used for the protective layers 4 and 5 is selected from the materials described in document Wo 95/00576, and preferably has a transition temperature (melting point) of about 70° C. These materials are produced by reacting a non-linear polyimide having imide functionality of at least three with a polyamine including at least two primary or secondary amino functions.

A transition temperature selected in the vicinity of 70° C. makes it possible to ensure that the cable in which the fibers or the ribbons of the invention are used will be capable, in operation,of withstanding temperatures up to 70° C., which is a conventional requirement for telecommunications cables.

It is also preferable for the transition temperature to be as low as possible above the above-mentioned preferred value so as to simplify as much as possible the equipment required for heating the reversibly cross-linked material used.

Other known reversibly cross-linked materials having the mechanical properties necessary for application to optical fibers or to optical fiber ribbons can also be used. The person skilled in the art is capable of selecting from all known reversibly cross-linked materials those which are suitable for this application, and can determine which are suitable by simple, routine operations.

The same applies to selecting a reversibly cross-linked material for the identification layer 6.

Figure 3:
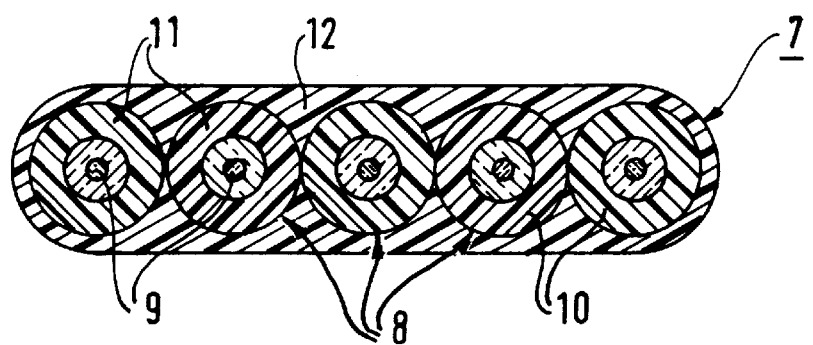
FIG. 3 is a cross-section through an optical fiber ribbon of the invention.

FIG. 3 shows an optical fiber ribbon 7 of the invention. The ribbon 7 comprises five optical fibers 8, each comprising a respective optical core 9 of silica-based material surrounded by optical cladding 10 likewise of silica-based material, in turn surrounded by primary covering 11 of reversibly cross-linked material, e.g. of the kind mentioned above for the layers 4 and 5 of the fiber of the invention shown in FIG. 2.

The five optical fibers 8 are placed side by side nd parallel to one another, substantially in a common lane, and they are embedded in a common protective matrix 12 of a reversibly cross-linked material.

More particularly, the reversibly cross-linked material used for the common protective matrix 12 is selected from the materials described in document Wo 95/00576 that have a transition temperature (melting point) close to 70° C. These materials are produced by reacting a non-linear polyimide having imide functionality of at least three with a polyamine comprising at least two primary or secondary amino functions.

In this case also, the transition temperature is preferably close to 70° C., for the reasons mentioned above.

Selecting appropriate reversibly cross-linked materials is likewise within the ability of the person skilled in the art.

Figure 4:
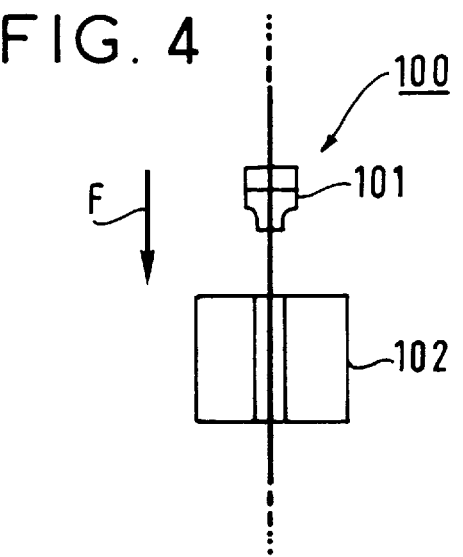
FIG. 4 shows in highly diagrammatic manner apparatus for manufacturing a fiber or a ribbon of the invention.

FIG. 4 shows in highly diagrammatic manner apparatus 100 enabling primary or secondary coverings 4 or 5 to be made on the optical fiber 1, or indeed enabling the identification layer 6 to be made thereon.

The apparatus 100 can also be used to make the primary coating 11 on the optical fibers 8, and the matrix 12 of the ribbon 7.

The apparatus 100 comprises a coating die 101 containing the reversibly cross-linked material in the fluid state, at a temperature greater than 70° C. In the travel direction, as represented by arrow F of the body to be treated, e.g. a bare optical fiber, the coating die 101 is followed by any known type of air cooling system 102 enabling the body to be treated to be brought back to ambient temperature.

Thus, the bare fiber passes firstly through the coating die 101, and at the outlet therefrom it is covered in a non-crosslinked covering of reversibly cross-linked material, after which it passes through the cooling system, and at the outlet thereof the covering has become cross-linked.

Naturally, the apparatus 100 can be used for making any kind of covering of reversibly cross-linked material in accordance with the present invention.

The present invention is naturally not limited to the embodiments described above.

Firstly, the invention can be used on the same optical fiber or the same ribbon to make one or more of the above-mentioned coverings or layers (the primary and secondary coverings, the colored identification layer). It is recalled that there is no need for the protective layers to be transparent.

Also, in a ribbon of the invention, the optical fibers can be bare, or protected by respective primary coverings, and optionally they can be covered in a colored identification layer, without that being essential.

The colored identification layer can be constituted by a reversibly cross-linked material to which the necessary pigment has been added, where appropriate.

Naturally, some of the above-mentioned layers can be made of reversibly cross-linked material while other layers are not. Nevertheless, where appropriate, care must be taken to coat a layer of reversibly cross-linked material only in layers of material that do not need to be raised to the transition temperature of the underlying reversibly cross-linked.

Finally, it is possible to replace any means by equivalent means without thereby going beyond the ambit of the present invention.

I claim:

1. An optical fiber comprising an optical core for guiding lightwaves transmitted by said fiber, the core being surrounded by optical cladding, itself surrounded by a protective covering of plastic material, the fiber being characterized in that said plastic material is a reversibly cross-linked material.

2. A fiber according to claim 1, characterized in that said material has a transition temperature close to 70° C.

3. A fiber according to claim 1, characterized in that said material is obtained by reacting a non-linear polyimide having imide functionality of at least three with a polyamine comprising at least two primary or secondary amino functions.

4. An optical fiber ribbon comprising a plurality of optical fibers disposed side by side and parallel to one another, substantially in a common plane, the fibers being embedded in a common protective matrix of a plastic material, the ribbon being characterized in that said plastic material is a reversibly cross-linked material.

5. A ribbon according to claim 4, characterized in that said material has a transition temperature close to 70° C.

6. A ribbon according to claim 4, characterized in that said material is obtained by reacting a non-linear polyimide having imide functionality of at least three with a polyamine comprising at least two primary or secondary amino functions.

7. A fiber or ribbon according to claim 1, characterized in that the fibers are covered in an identification layer of a reversibly cross-linked material.

8. A method of manufacturing a fiber or a ribbon according to claim 1, the method including a step of depositing said plastic material, and being characterized in that said deposition step is performed at a temperature greater than 70° C., at which temperature said material is fluid, cross-linking of said covering being performed by cooling to a temperature close to ambient temperature.

\* \* \* \* \*